United States Patent
Sheppard

[19]

[11] Patent Number: 6,050,171
[45] Date of Patent: Apr. 18, 2000

[54] HYDRAULIC POWER STEERING GEAR ASSEMBLY WITH UNLOADING VALUE

[75] Inventor: Peter H. Sheppard, Hanover, Pa.

[73] Assignee: R.H. Sheppard Company, Inc., Hanover, Pa.

[21] Appl. No.: 09/064,445

[22] Filed: Apr. 22, 1998

Related U.S. Application Data

[62] Division of application No. 08/659,144, Jun. 5, 1996, Pat. No. 5,803,201.

[51] Int. Cl.$^7$ ....................................................... F15B 15/22
[52] U.S. Cl. ............................................... 91/401; 91/422
[58] Field of Search ....................................... 91/401, 422

[56] References Cited

U.S. PATENT DOCUMENTS

| | | | |
|---|---|---|---|
| 3,092,083 | 6/1963 | Sheppard | 121/41 |
| 3,195,575 | 7/1965 | Sheppard | 137/625.69 |
| 3,315,570 | 4/1967 | Brewer et al. | 91/401 |
| 3,872,774 | 3/1975 | Forster et al. | 91/400 |
| 3,896,702 | 7/1975 | Shah et al. | 91/375 A |
| 3,896,703 | 7/1975 | Bertanza | 91/401 |
| 3,916,730 | 11/1975 | Sheppard | 74/751 |
| 3,935,790 | 2/1976 | Goff | 91/449 |
| 4,028,996 | 6/1977 | Jablonsky | 91/401 |
| 4,261,248 | 4/1981 | Elser et al. | 91/401 |
| 4,273,029 | 6/1981 | Shepard | 91/422 |
| 4,367,672 | 1/1983 | Elser | 91/375 A |
| 4,623,031 | 11/1986 | Drutchas et al. | 180/148 |
| 4,625,624 | 12/1986 | Adams | 91/375 A |
| 4,648,307 | 3/1987 | Rabe | 91/375 A |
| 4,729,283 | 3/1988 | Hillier | 91/189 |
| 4,736,674 | 4/1988 | Stoll | 92/5 R |
| 4,773,303 | 9/1988 | Stroud | 91/375 A |
| 5,086,864 | 2/1992 | Elser | 180/147 |
| 5,139,106 | 8/1992 | Elser et al. | 180/148 |
| 5,205,372 | 4/1993 | Kotake et al. | 180/132 |
| 5,287,792 | 2/1994 | Betros et al. | 91/375 A |
| 5,322,142 | 6/1994 | Elser | 180/148 |
| 5,419,235 | 5/1995 | Gilbert et al. | 91/375 R |
| 5,454,290 | 10/1995 | Cortes Guasch et al. | 91/375 R |
| 5,509,493 | 4/1996 | Lang et al. | 180/132 |

FOREIGN PATENT DOCUMENTS

| | | |
|---|---|---|
| 0 218 982 B1 | 9/1986 | European Pat. Off. . |
| 0 388 440 B1 | 2/1989 | European Pat. Off. . |
| 0 544 734 B1 | 8/1991 | European Pat. Off. . |
| 1810366 | 11/1968 | Netherlands . |
| 2 028 741 | 8/1979 | United Kingdom . |
| 2 151 996 | 12/1983 | United Kingdom . |

OTHER PUBLICATIONS

TRW, "TAS Poppets", Jan. 1992, pp. 1–15.

*Primary Examiner*—Edward K. Look
*Assistant Examiner*—Hermes Rodriguez
*Attorney, Agent, or Firm*—Thomas Hooker, P.C.

[57] ABSTRACT

A hydraulic power steering gear assembly includes an assembly body defining a piston chamber having opposed chamber ends with plunger passages formed in the ends, a reciprocating piston and a chamber having opposed ends and a passage extending between the piston ends, a check valve at each end of the piston passage, and a plunger assembly in each plunger passage with each assembly including a spring frictionally holding assembly in the passage and a poppet extending into the chamber to unseat a ball valve as the piston is moved toward one end of the chamber.

20 Claims, 3 Drawing Sheets

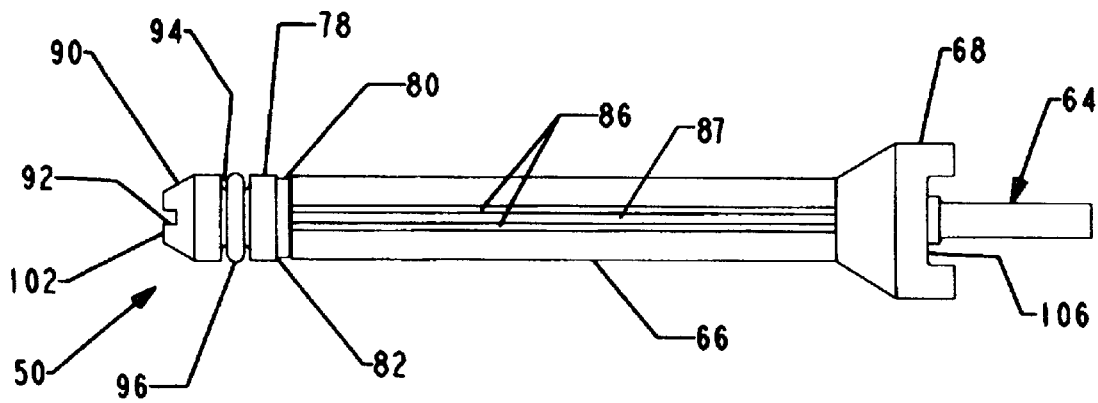
FIG. 5
FIG. 4
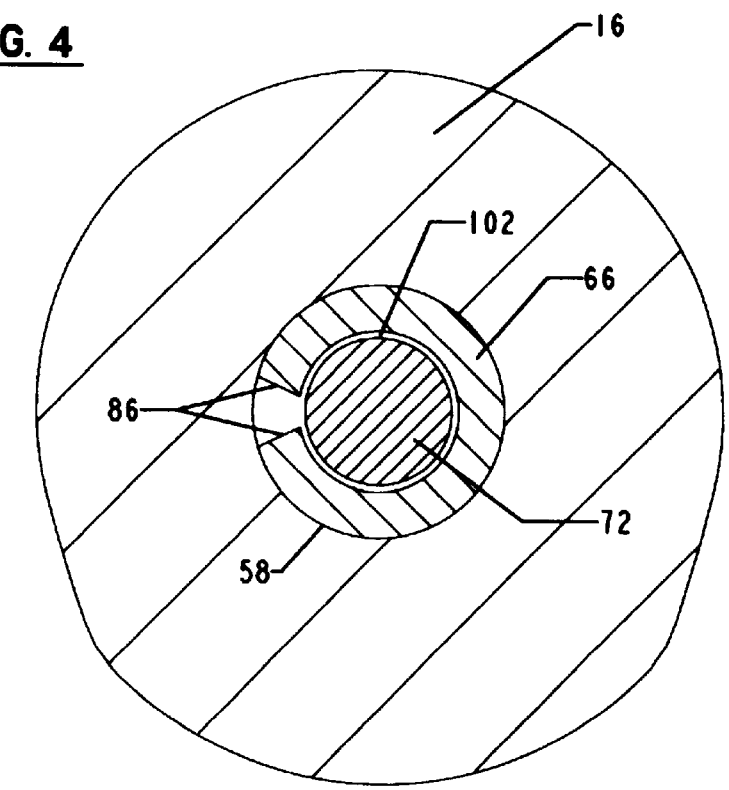

HYDRAULIC POWER STEERING GEAR ASSEMBLY WITH UNLOADING VALUE

CROSS REFERENCE TO RELATED APPLICATION

The invention is a division of prior application Ser. No. 08/659,144 filed Jun. 5, 1996 now U.S. Pat. No. 5,803,201. The entire disclosure of prior application Ser. No. 08/659,144 is hereby incorporated by reference herein.

FIELD OF THE INVENTION

The invention relates to hydraulic power steering gear assemblies with an operating piston and check valves in the piston to relieve pressure at the end of the piston stroke.

BACKGROUND OF THE INVENTION

Hydraulic power steering gear assemblies, particularly gear assemblies used to rotate the steering wheels of vehicles, particularly trucks, buses and the like, include a gear housing having a piston located in a chamber in the housing and moveable back and forth along the chamber. The piston provides a power assist to rotate the vehicle steering wheels. Check or relief valves are carried in the piston and are opened by poppet members at the ends of the cavity. The positions of the poppet members must be adjusted in order to open the valves and remove hydraulic steering assist at the end of the steering stroke, before the wheels are turned into engagement with wheel stops of the front axle.

Various types of poppet members have been used to open the relief valves. In some gear assemblies the members are mounted at the ends of the chamber and extend into the chamber to engage and unseat the valves in the piston. The poppet members are conventionally mounted in the end of the chamber using either a threaded connection or a pressed fit connection in which the members are press fitted into precise machine bores and are held in place in the bores by deformation of crush rings extending outwardly from the member.

The poppet members are adjusted in the gear assemblies by rotation of the vehicle steering wheel preferably without the necessity of performing an adjustment at the gear assembly. Also, the poppet members must be capable of repeated adjustment in the assembly, and then must hold their adjusted position during normal operation of the steering gear assembly, which may extend for many years.

Problems have been experienced with poppet members in the fitted conventional steering gear assemblies.

Poppet members which are threaded in the assembly cannot be automatically adjusted by rotating the steering wheel. Adjustment requires that a worker manually rotate the members in the gear assembly.

The pressed fit deformable metal type poppet members can be automatically adjusted using the steering wheel only, but lose their ability to maintain adjustment if their position has been adjusted a number of times. This is because these device are held in place by a pressed fit connection and movement or adjustment of the devices degrades the connection so that the devices are no longer held tightly in place. Further, the pressed fit devices require precision machining of the passage, adding to the expense of manufacture of the gear assembly.

Also, with press fit type poppet members, the members are extended toward the chamber prior to adjustment by extending a tool into the passage and tapping the device inwardly. This operation can easily result in a worker pushing the device entirely through the passage and into the chamber, where it disrupts operation of the gear assembly. The gear assembly must be taken apart to remove the poppet device.

SUMMARY OF THE INVENTION

The invention is an improved power steering gear assembly with an interior chamber, piston in the chamber and a pair of improved poppet members or plunger assemblies mounted in passages located at either end of the chamber and in alignment with conventional check valves mounted in the ends of the piston. The plunger assemblies each include a poppet end located in the chamber to engage the adjacent check valve and an elongate body extending from the poppet end into the passage to a head at the remote end of the body. A rolled spring pin surrounds the body and is held against longitudinal movement on the body. The spring pin is compressed in the passage to provide a large area spring connection with the passage wall. This large area spring connection holds the plunger assembly in place longitudinally in the passage by friction while permitting repeated movement or adjustment of the assembly along the passage as required during initial set up of the gear assembly, subsequent change of setting of the gear assembly and bleeding of air from the gear assembly.

The plunger assembly is initially driven inwardly along the passage into the chamber to an extended position and then moved out from the chamber to an adjusted position by movement of the piston in the chamber. Movement of the plunger assembly entirely into the chamber is prevented by an outwardly facing step in the passage which engages a complementary step on the plunger assembly and prevents movement of the member past the passage step.

The spring pin extends substantially completely around the plunger assembly to provide a large area friction connection with the passage wall. The spring surrounds a rod portion of the assembly, which is located a distance inwardly of the spring to assure that the spring has sufficient room to flex radially and engage the passage wall. The radial flexibility of the spring pin assures that the assembly is held tightly in proper position in the passage, and eliminates the necessity of a precision machined wall. The ends of the spring are confined between surfaces on the assembly to prevent longitudinal movement of the body relative to the spring.

Other objects and features of the invention will become apparent as the description proceeds, especially when taken in conjunction with the accompanying drawings illustrating the invention, of which there are 3 sheets and one embodiment.

DESCRIPTION OF THE DRAWINGS

FIG. 4 is a sectional view taken along line 4—4 of FIG. 3;

FIG. 5 is a view similar to FIG. 3 showing installation of a plunger assembly.

DESCRIPTION OF THE PREFERRED EMBODIMENT

Figure 1:
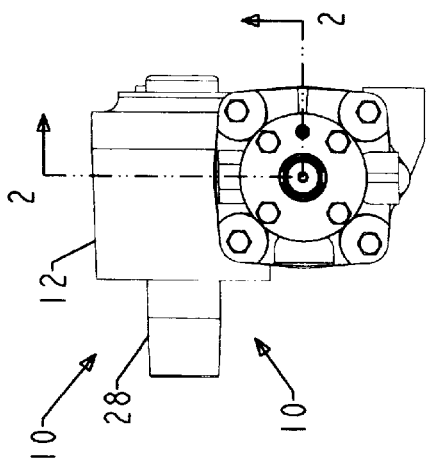
FIG. 1 is an end view of a steering assembly according to the invention.

High pressure steering gear assembly 10 provides power assisted steering to the steering wheels of a vehicle. The assembly includes a steering gear housing 12 defining a cylindrical chamber 14 extending between the ends of the housing. Cylinder head 16 closes one end of the housing and bearing cap 18 closes the other end of the housing. A piston 20 is confined in the chamber for movement between the ends of the chamber.

Vehicle steering input shaft 22 extends through bearing cap 18 into the chamber and into an axial recess in the piston. The input shaft is joined to the piston by a convention ball screw connection 24 which permits movement of the piston back and forth along the chamber in response to rotation of the input shaft.

Conventional power steering valve 26 is provided in bearing cap 18 and may be of the type used in M-series steering gear assemblies manufactured by R.H. Sheppard Co., Inc. of Hanover, Pa., assignee of the present application. Valve 26 controls the flow of pressurized hydraulic fluid into the chamber on one side of the piston while venting fluid from the chamber on the other side of the piston, in response to rotation of the input shaft. The pressurized fluid moves the piston in a work direction along the chamber 14 to provide power assisted steering for the vehicle.

A steering output shaft 28 is journaled in a bearing housing 12 with sector gear 30 mounted on one end of the shaft. The teeth on the sector gear 30 engage the teeth on rack 32 extending along the length of the piston 20 such that movement of the piston in the chamber rotates the output shaft. The other end of the output shaft is connected to a steering linkage, conventionally through a pitman arm mounted on the end of the shaft, to turn the steering wheels of the vehicle, with power assist, in response to driver rotation of a steering wheel connected to input shaft 22.

Passage 34 extends between the opposing ends of piston 20 and communicates chamber portions 36 and 38 on opposite ends of the piston. Ball-type check valves 40 and 42 are fitted in the ends of passage 34 with valve 40 adjacent chamber portion 36 and valve 42 adjacent chamber portion 38. Each valve includes a cylindrical valve seat 44 threaded in the end of the passage and a ball valve member 46 engaging the seat inwardly a short distance from the adjacent end of the piston. Each ball valve member is exposed to the adjacent chamber portion through the center of the valve seat. Coil spring 48 is comprised in passage 34 and normally holds the valve members against the seats to close the valves.

Figure 2:
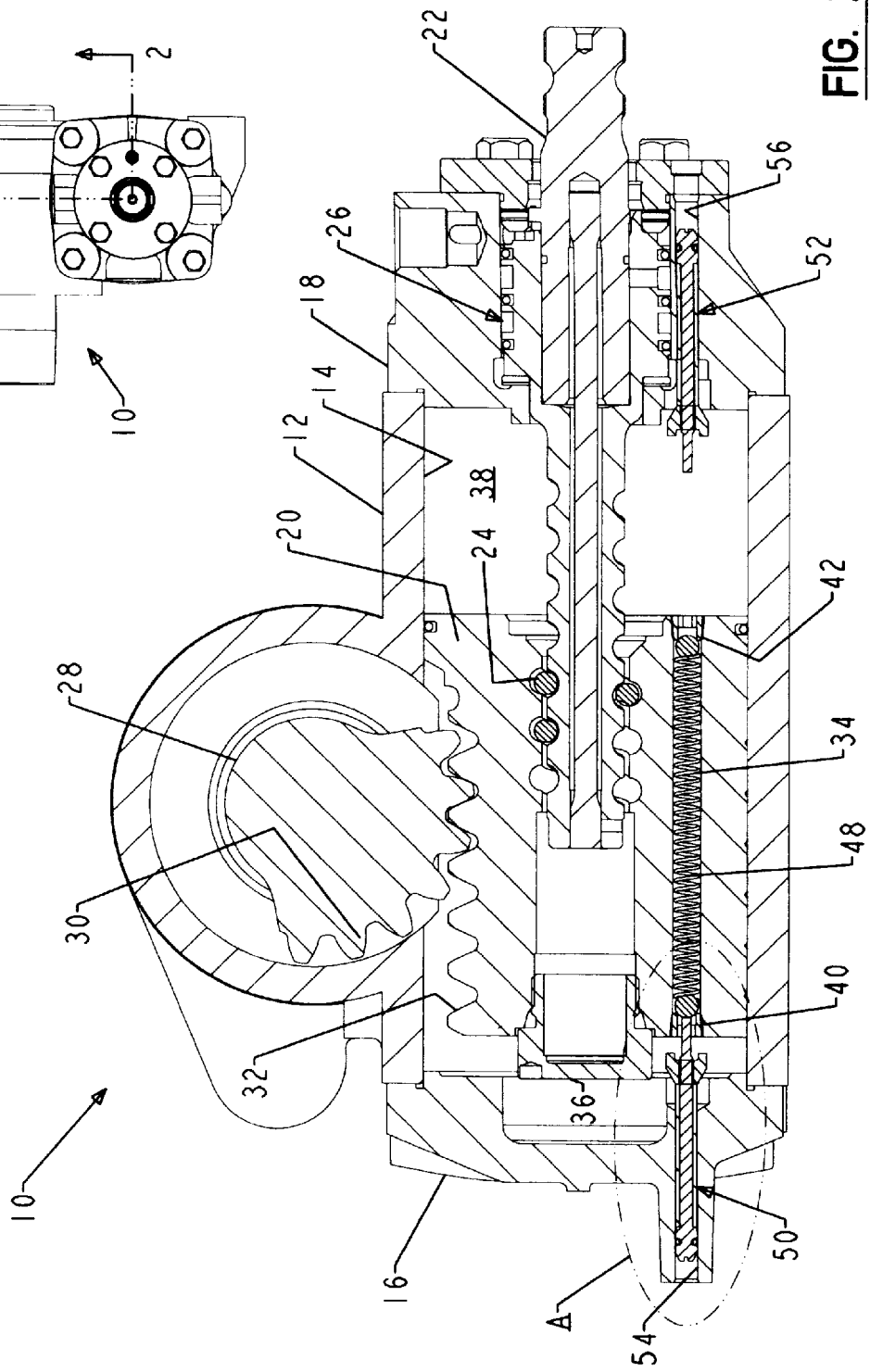
FIG. 2 is a sectional view taken along line 2—2 of FIG. 1.
Figure 3:
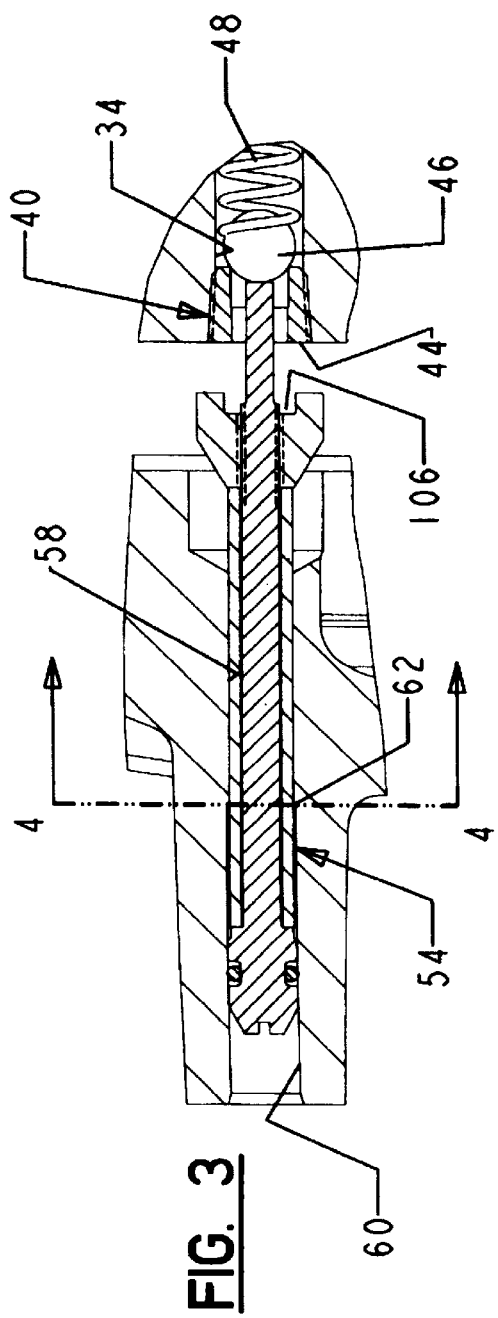
FIG. 3 is an enlarged sectional view of a portion A of FIG. 2.

Two like elongate plunger assemblies 50 and 52 are mounted in cylindrical passages 54 and 56 formed in cylinder head 16 and bearing cap 18, respectively. The passages 54 and 56 are co-axial with passage 34, as shown in FIGS. 2 and 3. Each of the passages 54, 56 includes an inner cylindrical portion 58 opening into the adjacent chamber portion 36, 38 and an outer cylindrical portion 60 opening to one end of assembly 10. As shown in FIGS. 3 and 4, the diameter of portion 58 is slightly less than the diameter of portion 60 so that the two portions meet at the center of the passage 54, 56 at a circumferential step 62 facing outwardly from the chamber 14.

Each of like plunger assemblies 50, 52 includes an elongate body 64, a cylindrical rolled spring pin 66 surrounding the center of the body and a stop nut 68 threaded on and secured to one end of the body. Body 64 includes a cylindrical head 70 at one end and an elongate rod 72 extending from the head inwardly toward chamber 14 to a reduced diameter poppet end 74. Threads 76 are provided on the end of the rod adjacent poppet end 74. As illustrated in FIG. 5, head 70 includes an outer cylindrical portion 78 having a sliding fit within outer passage portion 60 and an inner cylindrical portion 80 having a sliding fit in inner passage portion 58. Portion 80 is smaller than portion 78. The portions 78 and 80 are joined by inwardly facing step 82 shown best in FIG. 5. A second inwardly facing step 84 is located at the inner end of head 70 and rod 72. The outer end of head 70 is provided with an inward taper 90 and a drive surface 102 located inside the head. Slot 92 extends across the drive surface. Annular groove 94 is provided in a head portion 78 and an O ring seal 96 is fitted in the groove.

Figure 6:
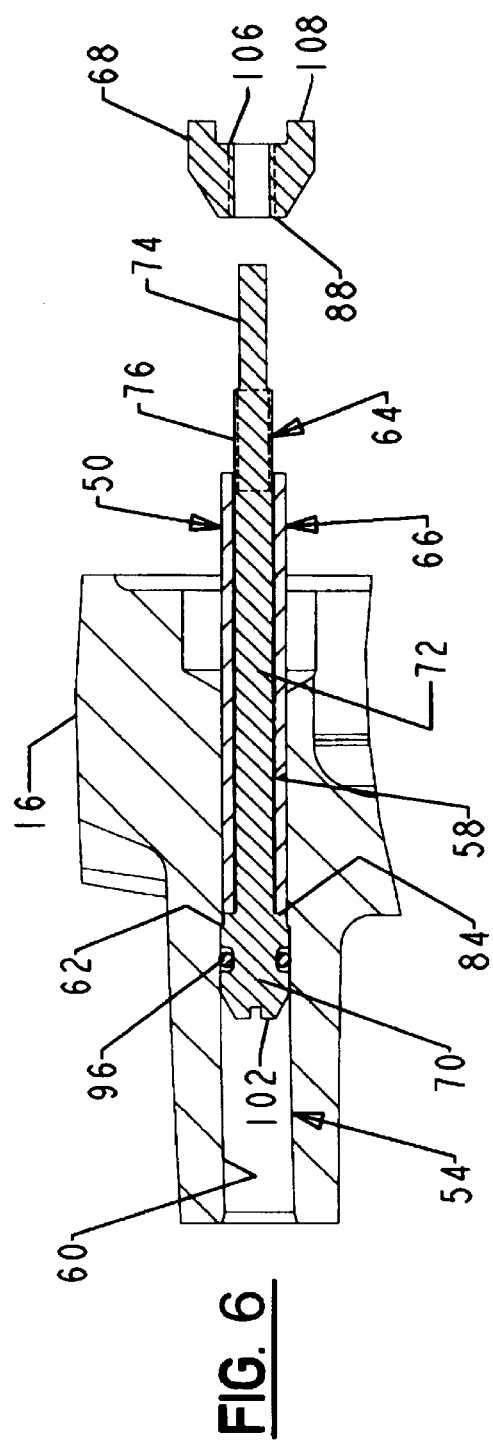
FIG. 6 is a side view of plunger assembly.

Spring pin 66 is rolled from a sheet of resilient spring metal, has a pair of opposed edges 86 extending along the length of the pin and is C-shaped in transverse cross section. The edges 86 define a slot 87 extending the length of the spring. The pin surrounds rod 72 with one end of the pin engaging step 74 on the head and the other end of the pin engaging the inner end 88 of nut 68 so that the spring pin is confined between step 84 and end 88 and cannot move longitudinally on the body, as illustrated in FIG. 6. The nut 68 includes a threaded central bore, and is extended over the poppet end 74 and threaded onto the threads 76 on the end of rod 72. Spring pin 66 has a relaxed diameter greater than the diameter of passage portion 58 so that the spring pin is compressed in the portion, tightly engages the passage wall and each plunger assembly is held tightly in place on its respective passage by friction engagement between the outer surface of the pin and the inner wall of the passage 58. The radially outwardly exerted spring force of springs 66 and the large area contact between the outer surfaces of springs and the walls assure that both the plunger assemblies 50 and 52 are held in a desired axial position in their passages during normal operation of assembly 10.

Each plunger assembly is mounted on its respective head 16 or cap 18 before the head and cap are mounted on housing 12. Mounting of assembly 50 in head 16 will be described, it being understood that assembly 52 is similarly mounted in cap 18. The body 64 and spring pin 66, with stop nut 68 removed, are piloted freely into the outer end of the passage 54. Head 70 is driven into the passage, compressing the spring pin as it moves into the inner, reduced diameter passage portion, until head step 82 seats against passage step 62, as illustrated in FIG. 6. Considerable force may be required to compress the spring as it is driven into the inner passage portion and to then move the spring frictionally along the portion. This force is applied to the inner drive surface 102 on head 70, located inside taper 90. The force may be sufficiently great to mushroom or deform surface 102 radially outwardly. The taper 90 assures that outer mushrooming of surface 102 does not increase the outer diameter of the head sufficiently to cause binding in the outer passage portion 60. Binding of this type between the head and the wall of the passage could prevent or make difficult adjustment of the plunger assembly in the passage.

After the body and spring pin of each assembly have been driven to the position of FIG. 6, the stop nuts 68 are threaded onto threads 76 until ends 88 engage the adjacent ends of the spring pins so that the spring pins are held against axial movement on the body. During threading of the nut on the body a screwdriver is extended into the assembly passage and into seat 92 to hold body 64 against rotation. The nut is then staked to the end of the rod to prevent unintended loosening. With plunger assemblies 50 and 52 mounted in passages 54 and 56, the cylinder head and bearing caps are mounted on the ends of body 12 with both plunger assemblies 50 and 52 fully extended into the cavity portions 36, 38 and with steps 82 engaging steps 62.

Extension of the plunger assemblies into the inner portions of passages 54 and 56 compress the spring pins so that the spring pins are resiliently held against the passage walls as shown in FIG. 4. The pins preferably are spaced outwardly from rod 42 to prevent binding against the rods. The gap 102 between the springs and rods assures resilient contact against the passage wall despite dimensional variations in the diameters of the passages, the shape of the pin and diameter of the rod. The surface-to-surface contact between the pins and the passage extends substantially around the circumference of the passage and along the length of the plunger assembly between the head and nut. The spring resilience of the pin biases the pin outwardly against the passage wall to assure a large area high pressure friction connection between the pin and wall. The spring pin is held on the assembly against axial movement between step 84 and end surface 88 of nut 68. The large area high pressure friction connections between the assemblies and the passages assure that after proper set up, the plunger assemblies are retained in fixed positions in the head and cap 16, 18.

Hydraulic power steering gear assembly, with fully extended plunger assemblies 50, 52, is installed in the power steering system of roadway vehicle so that rotation of the steering wheel of the vehicle rotates input shaft 22 to provide power assisted steering to the front wheels. The limits of the power steering stroke are then adjusted to assure that during operation of the steering system the front wheels cannot be over rotated.

After installation of assembly 10 in a vehicle power steering assembly, the steering wheels are elevated or placed on turn plates and a worker turns the steering wheel and connected input shaft between the full right and left positions. The steering wheel is first rotated to move piston 20 in one direction until one of the front wheels engages a wheel stop. The rotation of the steering wheel moves the piston toward one end of the chamber to open the check valve. During further rotation of the steering wheel and final movement of the piston, the end face of the piston engages the outer end contact surface 108 of adjacent nut 68 and pushes the plunger assembly inwardly along the passage 54, 56 until the wheel stop prevents further rotation of the front wheels and stops further movement of the piston.

After setting of the plunger assembly at one end of the chamber 14, the vehicle steering wheel is rotated in the opposite direction to move the piston to the other end of the assembly and rotate the steering wheels to the opposite maximum position against axle stop to thereby move the extended plunger assembly at the opposite end of the chamber into its respective passage an appropriate distance.

Slots 106 provided in the outer ends of nuts 68 form passages to permit hydraulic fluid flowing through passage 34 to flow outwardly past the nut when the piston engages the nut during initial setup of the plunger assemblies.

After the plunger assemblies have been adjusted the vehicle wheels are loaded so that during normal operation the driver is unable to turn the steering wheel sufficiently to shift the assemblies from their proper positions.

With both plunger assemblies 50 and 52 adjusted as described, the poppet ends of the assemblies are positioned in the chamber 14 to open check valves 40 and 42, and relieve pressure across the piston before the piston travels sufficiently to move the steering wheels into engagement with the stops. After proper setup adjustment of plunger assemblies, the large area of high force friction connections between the assemblies and their respective passages holds the assemblies in adjusted position in the head 16 and cap 18, thereby assuring that the gear assembly 10 maintains its adjusted steering stroke.

The spring bias frictional engagement between the plunger assemblies and the walls of the passages 54 and 56 not only reliably hold the assemblies in proper position after adjustment and during long term operation of the gear assembly but also permit readjustment of the assemblies in the passages as required, and then hold the assemblies in place the readjusted positions as before. For instance, the stop positions for the steering assembly may have to be readjusted in the event different size steering tires are fitted on the vehicle or the extent of rotation of the steering wheels is changed. In that event, readjustment of the piston stroke is easily accomplished by inserting a tool in each assembly passage 54, 56 and driving the assemblies to the fully extended positions where stops 82 engage steps 62. Once the wheels are raised or placed on turn plates and the assemblies have been fully extended, the assemblies are moved outwardly in the passages by rotation of input shaft 22, as previously described, to reposition the assemblies as required. Once repositioned, the large area spring contacts between the spring pins and inner portions of the passages hold the assemblies in place. Movement of the plunger assemblies in their respective passages slides the spring pins along the inner portions of the passages without injury to the pins, so that repeated adjustment does not alter the ability of the spring pins to hold the assemblies in place reliably. Adjustment of the positions of the plunger assemblies is easily performed by a single workman who rotates the vehicle steering wheel.

The provision of the O rings 96 in heads 70 prevents outward flow of hydraulic fluid through the plunger passages and eliminates the need for a cap or seal at the outer ends of the passages. Nonetheless, it may be desirable to seal the ends of the passages to prevent dirt and debris from collecting in the passages.

On occasion, it may be necessary to bleed air from cylinder chamber 14. In order to bleed all air from the cylinder it is necessary to extend the piston 20 fully to each end of the cylinder. This operation is easily performed in gear assembly 10 because the plunger assemblies 50 and 52 may be fully retracted into their respective passages 54 and 56 during bleeding and then may be fully reextended and adjusted to proper working positions, as previously described.

Plunger assemblies 50 and 52 are manufactured without the requirement for precision tolerances. Likewise, the plunger assembly passages 54 and 56 need not be manufactured to precision tolerances. These factors reduce the cost of manufacture of the gear assembly while providing improved performance over conventional gear assemblies using poppet valve members which are held in precisely toleranced passages using pressed fits and deformable crush rings.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A plunger assembly adapted to be mounted in a power steering assembly for opening a check valve when a piston is moved toward an end of a cylinder, the plunger assembly comprising an elongate body, a head at one end of the body, a poppet at the other end of the body, a stop member located inwardly of the poppet, and a spring substantially surrounding the body and extending between the head and the stop member, said spring having an outwardly facing large area friction surface.

2. A plunger assembly as in claim 1 including a stop surface on the head facing the poppet.

3. A plunger assembly as in claim 2 including a seal member surrounding the body.

4. A plunger assembly as in claim 1 wherein said head tapers to a reduced area drive surface facing away from the spring.

5. A plunger assembly as in claim 4 including a tool-engagement portion formed on the drive surface.

6. A plunger assembly as in claim 1 wherein said body includes a threaded portion adjacent the poppet and said stop member comprises a nut threaded on said threaded portion.

7. A plunger assembly as in claim 6 including a slot formed in the nut facing the poppet.

8. A plunger assembly as in claim 1 wherein said spring comprises a rolled spring pin.

9. A plunger assembly as in claim 8 wherein said body includes a threaded portion adjacent the poppet and said stop member comprises a nut threaded on said threaded portion.

10. A plunger assembly as in claim 9 including a seal member surrounding the body.

11. A plunger assembly adapted to be mounted in a power steering assembly for opening a check valve in a piston when the piston is moved toward an end of a cylinder, the plunger assembly comprising an elongate body having a poppet on one end and a head on the other end, a spring on the body between the head and poppet, and a friction surface on the spring facing outwardly of the body.

12. The assembly of claim 11 including a member on said body located between the spring and the poppet, and a stop surface on said member facing said poppet.

13. The assembly of claim 12 wherein said head and member include opposed surfaces facing each other, said spring located between said surfaces.

14. The assembly of claim 12 including a hydraulic fluid flow passage in said member.

15. The assembly of claim 11 wherein said spring surrounds said body, it is generally cylindrical and includes a slot extending along said body.

16. A plunger assembly adapted to be mounted in a power steering assembly for opening a check valve in a piston when the piston is moved toward an end of a cylinder, the plunger assembly comprising an elongate body, a head at one end of the body, a poppet at the other end of the body, an elongate generally tubular spring surrounding the medial portion of said body between the head and the poppet, said spring including an outwardly facing large area friction surface and opposed spring ends, said elongate body including surfaces overlying the ends of said spring.

17. The assembly of claim 16 including a slot in the spring.

18. The assembly of claim 17 wherein the slot extends between the ends of the spring.

19. The assembly of claim 16 wherein said spring comprises a slotted metal cylinder.

20. The assembly of claim 16 wherein the head includes a tool-engaging portion and including a removable member on the body between the poppet and the spring.

* * * * *

UNITED STATES PATENT AND TRADEMARK OFFICE
CERTIFICATE OF CORRECTION

PATENT NO. : 6,050,171
DATED : April 18, 2000
INVENTOR(S) : Peter H. Sheppard

It is certified that error appears in the above-identified patent and that said Letters Patent is hereby corrected as shown below: On the title page: Item [54] and Column 1, line 3, Title of the invention, replace "VALUE" with --VALVE--.

Signed and Sealed this

Twentieth Day of February, 2001

Attest:

NICHOLAS P. GODICI

Attesting Officer    Acting Director of the United States Patent and Trademark Office